United States Patent [19]

Gutsche

[11] 4,413,937
[45] Nov. 8, 1983

[54] ELEMENTS FOR A TOOL SYSTEM

[76] Inventor: Guenter E. Gutsche, 5330 Forget, St-Louis Terrebonne, Quebec J0N 1N0, Canada

[21] Appl. No.: 217,798

[22] Filed: Dec. 18, 1980

[51] Int. Cl.³ .................... B23B 45/00; B23B 31/02
[52] U.S. Cl. ................................ 408/239 A; 7/158; 81/177 A; 81/177 G; 279/1 A; 408/226; 408/239 R
[58] Field of Search ............ 279/1 A; 408/239 A, 408/223–226, 238, 239 R, 22, 711, 241 R; 7/158, 165, 167; 81/177 A, 177 N, 181, 182, 436, 438, 439, 460, 461, 437, 177 G, 177 R, 180 R, 184; 403/364, 359, 361, 287

[56] References Cited

U.S. PATENT DOCUMENTS

| 442,710 | 12/1890 | Marsh | 81/177 G |
|---|---|---|---|
| 759,042 | 5/1904 | Swan | 81/177 G X |
| 921,840 | 5/1909 | Jacobs | 81/177 A X |
| 1,701,427 | 2/1929 | Shields | 408/224 X |
| 1,725,299 | 8/1929 | Pickin | 408/224 X |
| 2,094,416 | 9/1937 | Sheffield | 403/364 X |
| 2,108,344 | 2/1938 | Miller | 81/439 |
| 2,460,673 | 2/1949 | Berscheid | 403/364 X |
| 2,470,631 | 5/1949 | McClellan | 403/359 X |
| 2,680,254 | 3/1952 | Hirschfeld . | |
| 2,689,131 | 3/1952 | Priest . | |
| 2,752,965 | 7/1956 | Mackey | 279/1 A |
| 3,023,015 | 1/1960 | Pankow . | |
| 3,289,290 | 12/1966 | Sandor | 81/436 |
| 3,290,918 | 12/1966 | Weasler | 403/359 X |
| 3,336,611 | 3/1966 | Schepp . | |
| 3,452,373 | 7/1969 | Vosbikian et al. | 81/437 X |
| 3,484,114 | 9/1967 | Rodin . | |
| 3,932,904 | 1/1976 | Nilsson . | |
| 3,973,784 | 8/1976 | Smith | 279/1 A |
| 3,973,784 | 8/1976 | Smith . | |
| 3,982,846 | 9/1976 | Steinbach . | |
| 3,994,615 | 11/1976 | Narang . | |
| 4,092,753 | 6/1978 | Fuhrmann . | |
| 4,107,800 | 8/1978 | Jorgensen . | |
| 4,187,045 | 2/1980 | Fischer | 408/226 X |
| 4,206,821 | 6/1980 | Emmerich | 403/287 X |
| 4,218,794 | 8/1980 | Seidel et al. . | |
| 4,218,795 | 8/1980 | Ernst et al. . | |

FOREIGN PATENT DOCUMENTS

| 2822372 | 11/1979 | Fed. Rep. of Germany | 7/158 |
|---|---|---|---|
| 483079 | 5/1917 | France | 408/226 |
| 1043735 | 6/1953 | France | 81/177 |

Primary Examiner—William R. Briggs
Assistant Examiner—Steven B. Katz

[57] ABSTRACT

A removable element for a tool system is disclosed. The element may be used in a system of slide-on tools and adaptors that eliminates a two-handed operation for changing tool bits. The element comprises at least one prong located at one end at a selected distance and substantially parallel to an axis of rotation of the tool system. The prong is adapted to slidingly fit and rotationally abut with another element of the tool system to transfer rotary motion between the elements, and means are provided for supporting a tool bit on the axis of rotation at the other end of the element from the prong.

24 Claims, 11 Drawing Figures

ELEMENTS FOR A TOOL SYSTEM

The present invention relates to rotating hand tools and more particularly to separate removable elements to fit on a tool holder and transmit rotation by a prong system.

In many work situations particularly in the construction trades an operator is required to carry out various successive operations on a workpiece making use of a variety of toolbits attached to electric hand drills, braces, "Yankee" screwdrivers and the like. Often these successive operations have to be repeated to make adjustments on the workpiece. For instance when hanging doors in a frame, adjustments are necessary requiring tool bit changes that are often time consuming because these changes involve two-hand operations that interrupt the work flow. Such work is often a one man operation carried out while standing on a ladder or workstool. One hand of the operator is needed to hold the workpiece in place while the other hand holds the tool used. The present invention provides a system of slide-on tools and adaptors that eliminates a two-handed operation for changing tool bits, and reduces the inefficiency inherent in the work procedure outlined above.

One attempt to accomplish simplification in changing tool bits is disclosed by Fuhrmann in U.S. Pat. No. 4,092,753. In this system a drill is selectively advanced through a hollow screwdriver. However, this arrangement limits the size of the drill that can be used, and eliminates the use of certain types of screws. Further it is expensive to manufacture, prone to premature wear, and apt to be plugged up by the debris accumulating in an operator's tool pouch where it is likely to be kept between uses. Another example of a slide-on adaptor is shown in U.S. Pat. No. 3,973,784 to Smith, where a polygonal shaft of a first tool bit is clamped in a chuck and used to rotate the adaptor for a second tool bit. However, in many cases the first tool bit often has a rounded shaft or does not protrude enough from the toolholder as is the case of the well known screw guns. Therefore even when this device can be used it has to be guided by the second hand with a ball bearing mounted sleeve. Pankow in U.S. Pat. No. 3,023,015 discloses an adaptor for dual tool bits that clamps into the chuck of an electric drill. The device is complex and requires relinquishing the hold on the power tool handle to disengage and rotate the adaptor tool. Rodin in U.S. Pat. No. 3,484,114 shows another embodiment of a tool attachment utilizing for rotation the holes in the tool chuck used to insert the chuck key for tightening the chuck sleeve. Many chucks have no such tightening means, and even in the key tightening variety, different sizes of chucks and holes exist, which together with the bulkiness of the device, limits the usefulness of such an adaptor.

It is an object of the present invention to provide a system of simple, small, light removable elements to fit on a standard tool holder with an easy one hand operation. It is a further object of the invention to use the cavities or grooves of standard chucks and toolholders with a first tool bit in place to hold prongs of slide-on adaptors and tools to transmit rotation. A further object of the invention is to create a tool system where different tool elements are slidingly stacked on each other, ready for selective use, such selection being made by pulling the stack apart at the desired tool element.

Another object of the invention is to provide tools that are clamped in chucks by means of the flanges of the jaws, giving positive torque transfer and permitting these chucks to be sufficiently tightened by hand friction.

Chucks and tool holders on power or hand tools form either 2, 3 or 4 cavities when clamping a tool bit. The present invention provides removable elements with one or more prongs to slide into these cavities. These prongs hold, center and rotate the elements which have tool bits integral or separately attached thereto on the chucks. One three-pronged adaptor element with one prominent prong can be made to fit most existing power and hand tool chucks. Special adaptor elements can be provided for different tools.

The present invention provides an element for a tool system comprising at least one prong located at one end at a selected distance and substantially parallel to an axis of rotation of the tool system, the prong adapted to slidingly fit and rotationally abut with another element of the tool system to transfer rotary motion between the elements, and means for supporting a tool bit on the axis of rotation at the other end of the element from the prong.

In other embodiments the element may have rotational abutment means at the other end to mate with the prong of an adjacent element. The element may be used in combination with a tool holder having a first tool bit rigidly held therein and having abutment means for the prong of the element to slidingly fit and rotationally abut therewith, the element including a second tool bit extending beyond the first tool bit. A plurality of prongs may be provided of equal length, or having one prong longer than the others. The prongs may be flexible, they may have a papered portion where they join the element to engage and grip with another element of the tool system. One prong may have a detent notch to positively hold the element with another element, and means are provided to engage and disengage the detent notch.

The present invention also provides combination a first tool bit, adaptor means to grip the first tool bit, the adaptor means having rotational abutment means to transfer rotary motion and an element having at least one prong located at one end at a selected distance and substantially parallel to an axis of rotation of the first tool bit, the prong adapted to slidingly fit and rotationally abut the abutment means of the adaptor means, and means for supporting a second tool bit in the element on the axis of rotation extending beyond the first tool bit at the other end of the element from the prong.

In further embodiments the rotational abutment means may be provided on a first tool bit or on a tool holder. The abutment means can include at least one cavity or groove, or in another embodiment a protrusion.

In a still further embodiment, the present invention provides a tool system having an axis of rotation comprising, a first element having a rotational abutment means to transfer rotary motion, a second element having at least one prong located at one end at a selected distance and substantially parallel to the axis of rotation, the prong adapted to slidingly fit and rotationally abut the abutment means in the first element, rotational abutment means provided at the other end of the second element, and a third element having at least one prong located at one end at a selected distance and substantially parallel to the axis of rotation, the prong adapted to slidingly fit and rotationally abut the abutment means in the second element, and means for supporting a tool bit in the element on the axis of rotation at the other end of the third element from the prong.

In drawings which illustrate embodiments of the invention:

Figure 1:
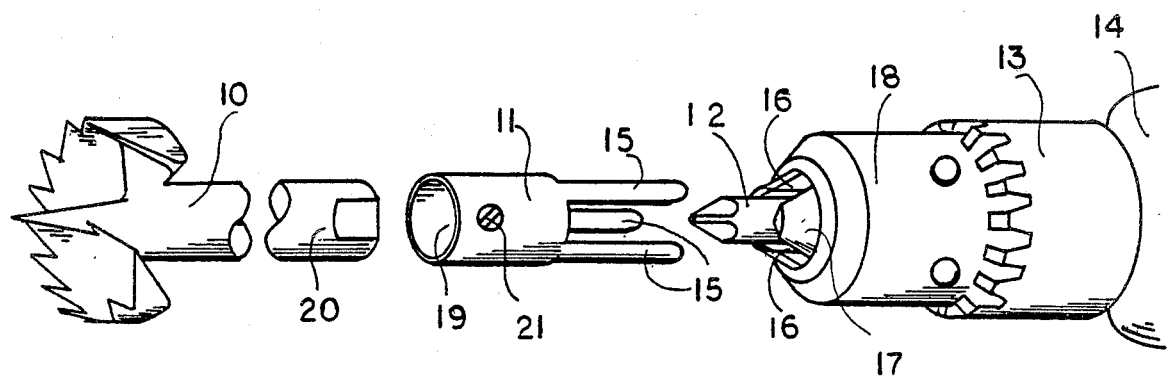
FIG. 1 is an exploded perspective view of a drill chuck, a removable element and a drill bit.

Referring now to the drawings, FIG. 1 shows a tool system consisting of a multispur bit 10 and removable element 11 with a screwdriver bit 12 held in a three jawed chuck 13 of electric hand drill 14. Removable element 11 has three prongs 15 that slidingly enter three cavities 16 in chuck 13 that are formed between the screwdriver bit 12, the three jaws 17 and the chuck body 18. The other end 19 of element 11 fits over the shank 20 of drill bit 10 and set screw 21 grips and holds the shank 20. When the tool system is assembled and prongs 15 are slidingly inserted into cavities 16, power is applied to the drill 14, the chuck 13 rotates transferring motion of three jaws 17 to the prongs 15 through the element 11 to the multispur bit 10.

Figure 2:
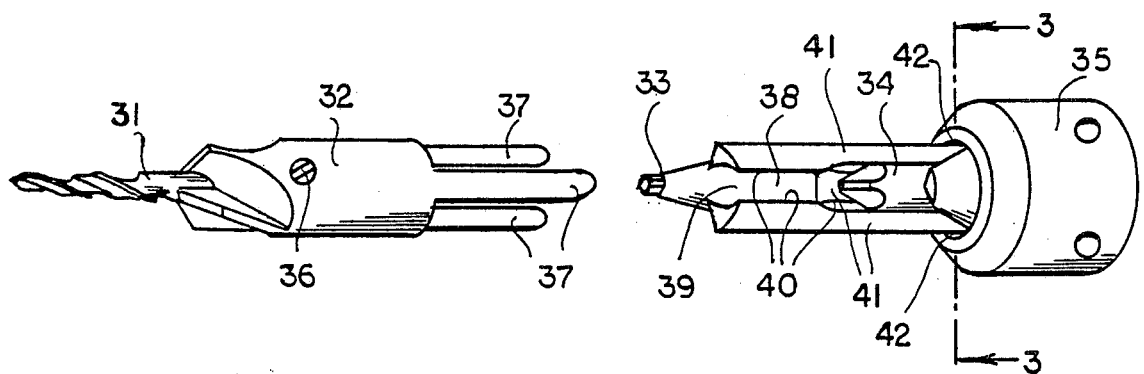
FIG. 2 is an exploded perspective view of a drill chuck with a first removable element in the chuck and a counter sink drill in a second removable element separate.
Figure 3:
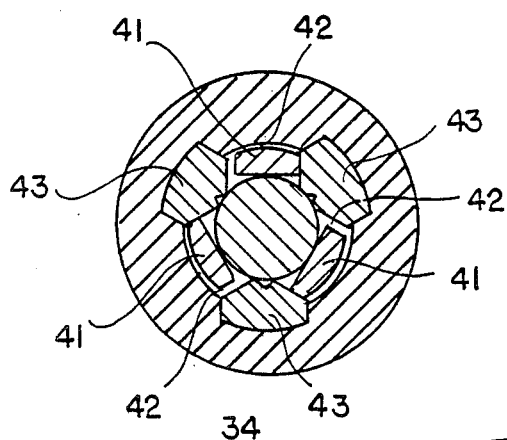
FIG. 3 is a cross section at line 3—3 on FIG. 2.

FIGS. 2 and 3 show another tool system comprising a drill bit 31, countersink element 32, "Torx" screwdriver element 33, and "Phillips" screwdriver bit 34 in a three jawed drill chuck 35. The drill bit 31 is adjustably held in the countersink element 32 by a set screw 36. Countersink element 32 is equipped with the three prongs 37, which slidingly fit into three grooves 38 of screwdriver element 33. These grooves 38 are formed by the shank portion 39 and the six sides 40 of the prongs 41 of the "Torx" screwdriver element 33. These prongs 41 engage in the three cavities 42 of drill chuck 35. When countersink element 32 is slid onto "Torx" screwdriver element 33 and chuck 35 rotated, torque forces are transmitted from the jaws 43 of chuck 35 to the prongs 41 of the "Torx" screwdriver element 33 and from prong sides 40 to the prongs 37 of the countersink element 32, powering the cutting action of the drill bit 31. In practice these two tool systems contain the kind of tool elements used to mortise a doorlock and predrill and set screws for such a lock, strikerplate and hinges, doing so speedily with one hand holding the drill, and the other hand sliding on the different elements with the tool bits therein. The countersinking element 32 is small enough to be held in the palm of one hand when the finger and thumb feeds the screws to the "Torx" screwdriver elements 33 or the "Phillips" screwdriver bit 34, thus allowing for convenient alternate use of tool bits and the screws driven home by these screwdriver bits. In a preferred embodiment, the first tool bits 33, 34 are for driving fasteners, and the second tool bit 31 is a cutting tool such as a tap, drill, reamer, countersink, etc.

As may be seen in FIG. 3, the three prongs 41 touch the screwdriver tool shank 34 and abut the jaws 43 in response to rotating forces. The sliding fit of prongs 41 in cavities 42 is such that enough static friction is maintained between them that drill chuck 35 can be pointed downward without the elements 32 and 33 sliding out of the chuck 35. This static friction may be enhanced by imparting flexibility to the prongs 41 giving them a frictional surface, or using detention means.

Figure 4:
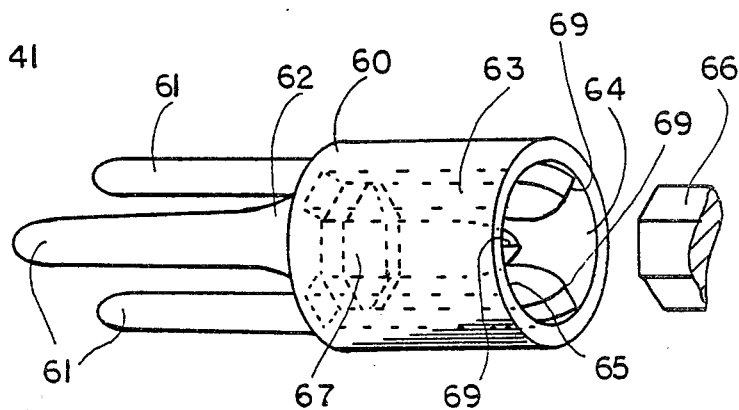
FIG. 4 is a partial perspective view of a tool holder removable element and a separate tool bit.

FIG. 4 shows a tool holder element 60 having three prongs 61 terminating in thicker tapering portion 62. The tool holder element body 63 has a cavity 64 with three grooves 65 which are slightly larger than the three prongs 61. A portion of hexagonal tool bit shank 66 is shown in position to slide into cavity 64, shank 66 is held in place in the tool holder element 60 by an end plug 67 which may be of a magnetic type. In addition to shank 66 cavity 64 slidingly admits in the three grooves 65 the prongs of further elements which are substantially the same but contain different tool bits. The three grooves 65 widen at the end of the cavity to meet at the three points 69 to facilitate the introduction of the prongs of other elements. The three thicker tapering portions 62 when fully inserted into the grooves or cavities of further elements provided between the jaws of a drill chuck, allows the element to be held firmly in place while a drill shank may be held only loosely between the drill chuck jaws, imparting a slipfree rotation to any tool element requiring high torque forces, but requiring only handtightening of the chuck.

Figure 5:
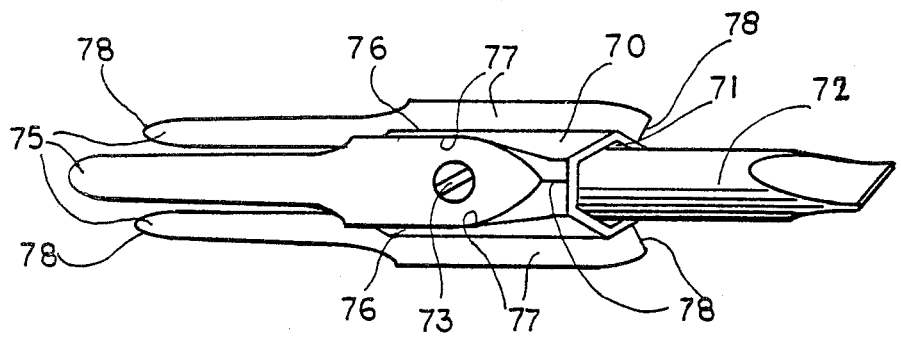
FIG. 5 is a perspective view of a tool holder removable element with a screwdriver bit.

FIG. 5 illustrates a tool holder element 70 of hexagonal cross section having a hexagonal cavity 71 containing a round shaft screwdriver bit 72 held against rotation by one or more set screws 73. The prongs 75 of the element 70 slidingly engage grooves or cavities of a drill chuck or another element. Three grooves 76 are formed by the tool holder element 70, and the six sides 77 of the prongs 75 are provided to slidingly admit the prongs of another element. The sides 77 of prongs 75 are shown to taper to points at ends 78 facilitating the meshing of prongs 75 with grooves and cavities of other elements.

Figure 6:
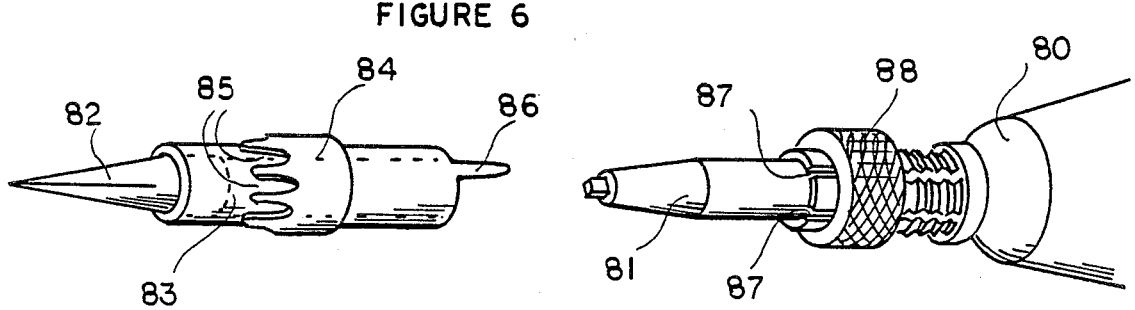
FIG. 6 is an exploded perspective view of an awl in a removable element and a screwdriver bit in a combination screwdriver.

In FIG. 6 is shown a combination screwdriver 80 holding a "Robertson" screwdriver bit 81. An awl 82 is press-fitted into a hollow shaft 83 which comprises an adaptor collar 84 exposing notches 85 that can slidingly accept the prongs of other tool elements. The hollow shaft 83 has a single prong 86 at one point on its periphery which slidingly fits into any one of the four cavities 87 on the collet chuck 88 commonly used on this type of tool. When driving any wood screws by hand, particularly in hard wood, with slotted screws, with worn tool bits or when a screw has to be slightly laterally displaced, use of an awl is mandatory for good results. This embodiment makes possible an easy one hand tool change in an awl-screwdriver sequence of operation.

Figure 7:
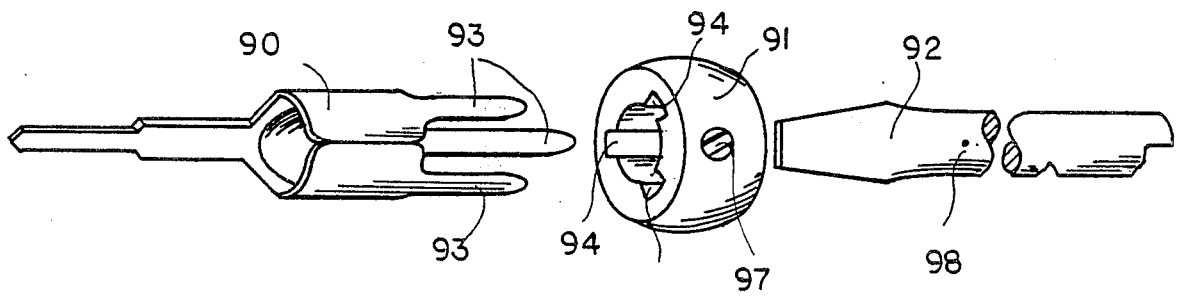
FIG. 7 is an exploded perspective view of an integral countersink element, collar and screwdriver bit.

In FIG. 7 a screw sinking tool element 90 is shown with a collar 91 for a "Yankee" screwdriver bit 92. Three prongs 93 on the element 90 can slidingly engage the three grooves 94 of the collar 91 which is held on screwdriver bit 92 by means of one or more set screws 97 resulting in an indentation spot 98 on bit 92. Tool element 90 is of the well known variety formed from sheet metal. Besides making the "Yankee" quick return screwdriver compatible with the elements of this invention, the thus equipped "Yankee" screwdriver can be changed from one bit mode to another without having to press the handle against ones body while retracting its sleeve with one hand and changing the bit with the other. In another embodiment (not shown) the "Yankee" screwdriver toolholder maybe fitted with at least one notch to serve as an abuttment means.

Figure 8:
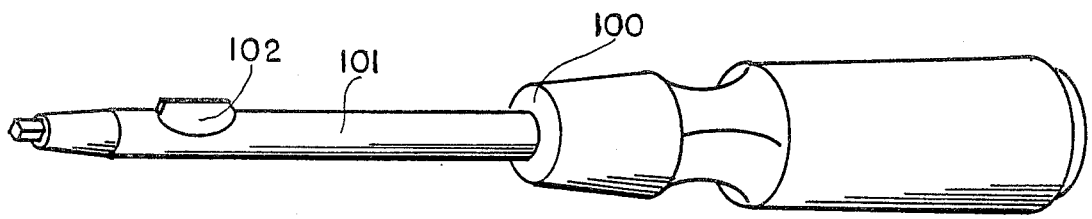
FIG. 8 is a perspective view of a screwdriver with a ridge or protrusion on the shaft.

FIG. 8 shows a "Robertson" type screwdriver 100 which has machined on its shaft 101 a protrusion or ridge 102 against which can abut any of the prongs of elements made according to this invention. A variety of methods is available to those skilled in the art to produce protrusion 102, for instance it could take the form of a radially inserted pin.

Figure 9:
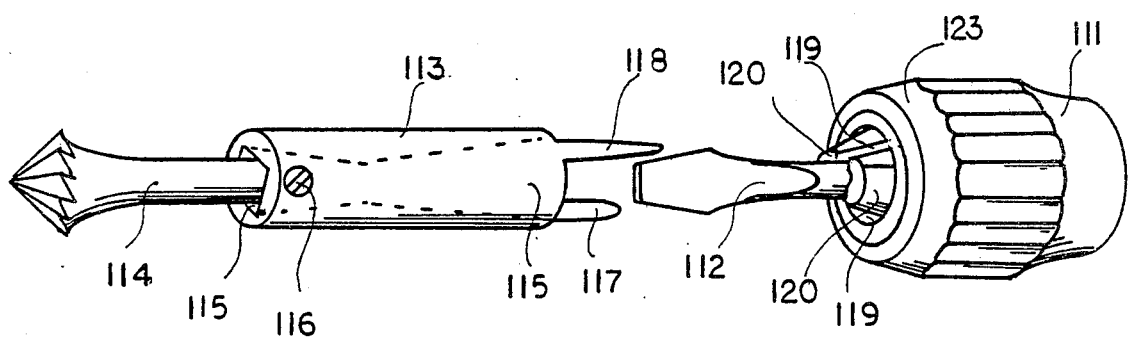
FIG. 9 is an exploded perspective view of a drill chuck with a screwdriver bit and a removable element holding a countersink.

FIG. 9 shows a chuck 111 of a hand brace that clamps tool bit 112. The removable element 113 holds a countersink 114 in a tapered cavity 115 by means of setscrew 116. Phantom lines indicate the shape of the other end of cavity 115 to slidingly accommodate tool bit 112 when element 113 is slid towards chuck 111. The two prongs 117 and 118 fit into cavities 119 formed by the two jaws 120 of the chuck 111. Rotation is imparted from chuck 111 with jaws 120 via the prongs 117 and 118 through the element 113 to the countersink 114. This arrangement allows a fast one hand tool change. Prong 118 is shown to be longer than prong 117 permitting insertion of element 113 into other types of chucks.

Figure 10:
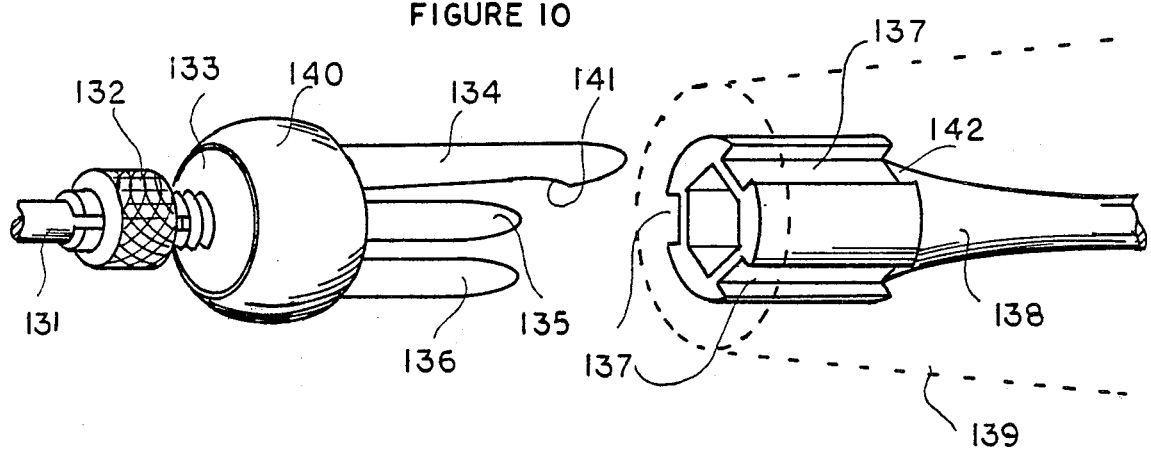
FIG. 10 is an exploded perspective view of a tool holder for a screw gun and a tool bit in a removable element.

FIG. 10 shows a shank of a drill bit 131 held by a collet chuck 132 in an adapter element 133 having prongs 134, 135 and 136. These prongs slidingly fit into three grooves 137 formed on tool holder 138 of a screw gun 139 shown in phantom outline. Predrilling and other operations are thus possible with this specialized screw gun 139 without first having to resort to the use of pliers to remove a toolbit from the tool holder 138. Prong 134 is shown to be longer than the prongs 135 and 136, making the adaptor element 133 compatible with the cavities 119 of the brace chuck 111 shown in FIG. 9 or the cavities 87 of the combination screwdriver 80 shown in FIG. 6 or any of the odd numbered cavities shown in the illustrations. Adaptor element 133 has a displaceable sleeve 140, which when moved toward tool holder 138 depresses prong 34, engaging detent notch 141 on the end of prong 134 from the back 142 of a groove 137 in tool holder 138. Such detention notch 141 may engage into the backs or detention grooves of different types of tool bits. The feature of a longer prong can be used on any of the embodiments to assure compatibility of all tools in the system. Sleeves that are not shown may be fitted over the tool holder and adaptor elements to keep prongs in place and strengthen the structure of these elements or to serve as alignment aids for joining elements. The grooves shown on tool holder 138 are identical to those required to adapt a hexagon sheet metal screwdriver tool bit.

Figure 11:
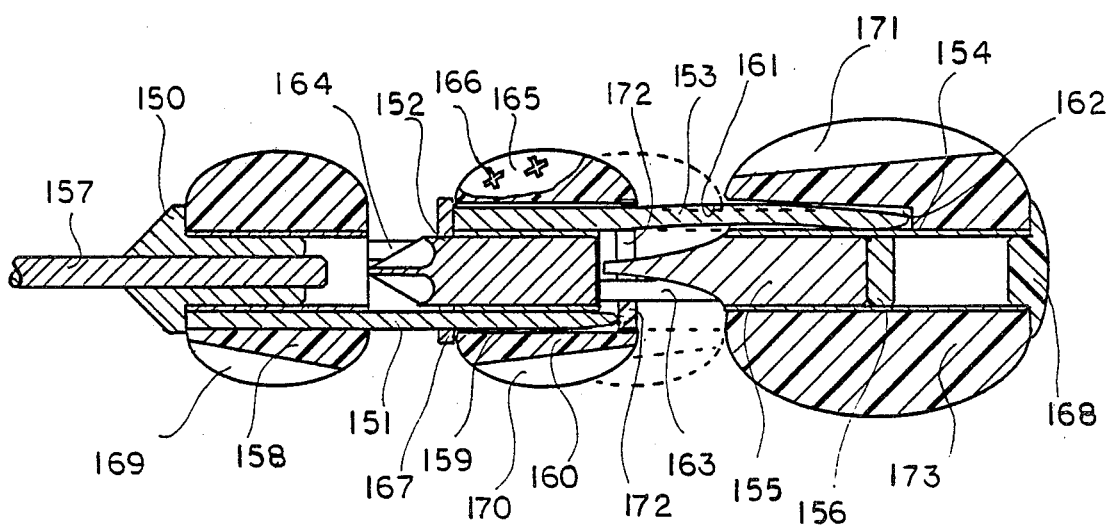
FIG. 11 is a longitudinal cross sectional view of three different tool bits according to one embodiment of the invention.

In FIG. 11 may be seen a tool system with a tool element 150 which is a countersinking tool attached by a prong 151 to a "Phillips" screwdriver element 152 held by a spring prong 153 to tool holding element 154 in the form of a stub screwdriver with a slot screwdriver bit 155 held by a magnetic end plug 156. Tool element 150 holds a drill bit 57 and has a sloped and fixed handling sleeve 158 with prong 151 fitting slidingly into cavity 159 of tool element 152, which in turn has a sliding sleeve 160 that can force protruding portion 161 of spring prong 153 toward the rotating axis of the tool system, thereby clamping the spring prong 153 into the cavity 162 of tool element 154. The sliding sleeve 160 is shown in phantom lines in this spring depressing position. Further prongs 163 and 164 are partially exposed in their 120° offset position between the tool elements 150, 152, and screwdriver bit 155. The handle 173 of stub screwdriver 154 serves as the proximal end piece of the tool system or stack of tool elements 150, 152 and 154, that can of course accommodate further tool elements which are not shown. The surface 165 of sleeve 160 has markings 166 that identify the tool element 152 as a "Phillips" screwdriver. Any of the prongs of the tool system may have a detent notch to engage in the back of other elements or tool bits.

End piece 167 limits the travel of sliding sleeve 160. Plug 168 caps handle 173. Indentations 169, 170 and 171 in sleeves 158, 160 and handle 173 respectively serve as roll-impediments and gripping aids.

When trying to separate element 152 from the rest of the tool system by pulling sliding sleeve 160 toward tool element 150, sleeve 160 first of all slides off the protruding portion 161 of prong 153 thereby releasing prong 153, while the prongs of other elements that tool system may contain remain clamped in their depressed position. Thus, only the selected element 152 is easily disengaged. Conversely inserting element 152 by pushing sleeve 160 toward element 154 clamps the prong 153 into cavity 162 when this movement is completed. The notched guiding ring 172 on sleeve 160 fits between prongs 153 and 163 holding the sleeve 160 against rotation when tool element 152 is used as part of a hand screwdriver.

As may be seen the present invention makes use of the cavities formed between chucks and tool bits. It uses this largely unused space to admit prongs that in an easy sliding fit transmit rotary motion to further tool bits. Adaptor elements or modified tool holders are provided for tools that lack chucks. The geometry of these prongs lends itself to allow stacking of such tool elements on each other in readiness for selection to use, creating a multiple tool system that can be interchanged between several drive modes. The elements of this invention are thus compatible with each other and the majority of existing dimensions in chucks and tool holders of hand tools. Use of this invention increases efficiency and encourages the use of the appropriate tools, a boon to quality workmanship. The invention increases the proportion of work time spent on actual production and reduces the time and effort spent on tending equipment and changing tools resulting in higher productivity.

The embodiments of the invention in which an exclusive property or privilege is claimed are defined as follows:

1. An element for a tool system having an axis of rotation and fitting a chuck, said chuck having convergeable gripping means and a first tool bit rigidly held therein said gripping means having walls defining at least two circumferentially spaced, axially extending recesses, said element comprising:
   (a) at least one axially extending prong at one end and substantially parallel to and at a selected distance from said axis of rotation, said prong dimensioned and positioned to slidingly fit over said first tool bit and to fit slidingly into one of said recesses and rotationally abut one of said walls, said prong being slidably receivable into a space defined by a sector of 60° on said axis of rotation, (b) centering means that are dimensioned to slidingly fit and at least partially enclose the first tool bit and (c) working means at the other end of said element for performing a work operation.

2. The element according to claim 1 where rotational abutment means are provided that are exposed toward the other end of said element, said rotational abutment means positioned and dimensioned to slidingly accept the prong of a further element.

3. An element according to claim 1 wherein said centering means are additional prongs equispaced about and substantially parallel to the axis of rotation and dimensioned and positioned to slide over and align with said first tool bit.

4. The element according to claim 1 or 2 wherein a plurality of elastic prongs are provided equispaced about the axis of rotation and compression means are provided whereby said prongs can be selectively pressed toward the said axis of rotation so as to lock said prongs with a selected object positioned between them.

5. The element according to claim 4 wherein said prongs have a portion that is curved outwardly from said axis of rotation, and said compression means press said portion selectively toward said axis of rotation.

6. The element according to claim 1 or claim 2 wherein the element is in the form of a sleeve.

7. The element according to claim 2 wherein three prongs are provided with three grooves between the prongs representing rotational abutment means to slidingly engage with three prongs of an adjacent element.

8. The element according to claim 7 wherein the three prongs are tapered at both ends to facilitate sliding engagement between elements.

9. The element according to claim 2 wherein the rotational abutment means includes at least one internal groove in a sleeve.

10. The element according to claim 2 wherein the rotational abutment means includes at least one external groove formed in the element.

11. The element according to claim 1 or claim 2 wherein the working means comprises a tool holder for holding different tool bits.

12. The element according to claim 1 or claim 2 wherein a plurality of prongs are provided equispaced about the axis of rotation.

13. The element according to claim 1 or claim 2 wherein a plurality of prongs are provided equispaced about the axis of rotation, each of the prongs extending for the same length.

14. The element according to claim 1 or claim 2 wherein a plurality of prongs are provided equispaced about the axis, one of the prongs extending further than the others.

15. The element according to claim 1 or claim 2 wherein a plurality of prongs are provided having a tapered portion where they join the element to engage and grip with another element of the tool system.

16. The element according to claim 2 wherein a plurality of prongs are provided extending for substantially the full length of the element, the prongs having sides which form rotational abutment means to mate with the prongs of an adjacent element.

17. The element according to claim 1 wherein the first tool bit is for driving fasteners and the working means is a cutting tool.

18. The element according to claim 1 or claim 2 wherein the prong of the element is dimensioned to slidingly fit and rotationally abut a chuck of an electric power tool.

19. The element according to claim 1 or claim 2 wherein the prong of the element is dimensioned to slidingly fit and rotationally abut a chuck of a manual hand tool.

20. In combination a tool holder and an element having a common axis of rotation, said element comprising:

(a) at least one axially extending prong at one end and substantially parallel to and at a selected distance from said axis of rotation, (b) centering means having a surface substantially parallel to said axis of rotation, (c) working means at the other end of said element for performing a work operation;

said tool holder comprising:

(d) fixed rotational abutment means positioned at a selected distance from said axis of rotation and dimensioned to slidingly accept the prong of said element, said abutment means defining a space consisting of a sector of 60° on said axis of rotation, (e) element centering means having a surface substantially parallel to said axis of rotation and positioned to slidingly accept the prong and centering means of said element (f) driving means for imparting rotation to said tool holder.

21. A tool holder as in claim 20 wherein said centering means comprises a tool bit.

22. A tool system comprising a tool holder and first and second elements having a common axis of rotation said first element comprising:

(a) at least one axially extending prong at one end and substantially parallel to and at a selected distance from said axis of rotation, (b) centering means having a surface substantially parallel to said axis of rotation, (c) working means at the other end of said element for performing a work operation;

said second element comprising:

(d) at least one axially extending prong at one end and substantially parallel to and at a selected distance from said axis of rotation, (e) centering means having a surface substantially parallel to said axis of rotation, (f) working means at the other end of said element for performing a work operation;

(g) rotational abutment means at the other end of said element positioned and dimensioned to slidingly accept the prong of said first element;

said tool holder comprising:

(h) fixed rotational abutment means positioned at a selected distance from said axis of rotation and dimensioned to slidingly accept the prong of either of said elements, said abutment means defining a space consisting of a sector of 60° on said axis of rotation, (i) element centering means having a surface substantially parallel to said axis of rotation and positioned to slidingly accept the prong and centering means of said element, and (j) driving means for imparting rotation to said tool holder.

23. A tool system as defined in claim 22 where the said working means are positioned centrally on said axis of rotation and where said second element has to be uncovered by removing the said first element so as to use its working means.

24. A tool bit having an axis of rotation and fitting a chuck with three radially movable jaws, the sides of said jaws defining axially extending recesses, said tool bit comprising:

(a) three axially extending prongs equispaced about and substantially parallel to said axis of rotation and defining a space interior of said prongs and open to one end of said tool bit, said prongs dimensioned and positioned to slidingly fit into said recesses to center said tool bit on said axis and to receive rotational forces from the sides of said jaws, (b) working means for performing a work operation, and (c) a member joining said prongs and said working means.

* * * * *

UNITED STATES PATENT AND TRADEMARK OFFICE
CERTIFICATE OF CORRECTION

PATENT NO. : 4,413,937
DATED : Nov. 8 1983
INVENTOR(S) : Guenter E. Gutsche

It is certified that error appears in the above-identified patent and that said Letters Patent are hereby corrected as shown below:

column 2, line 35 change "papered" to -tapered-
column 2, line 41 after "provides" insert -in- Signed and Sealed this Thirteenth Day of November 1984

[SEAL]

Attest:

GERALD J. MOSSINGHOFF

Attesting Officer

Commissioner of Patents and Trademarks